(12) United States Patent
Barker et al.

(10) Patent No.: US 8,705,851 B2
(45) Date of Patent: Apr. 22, 2014

(54) METHOD AND APPARATUS FOR TRAINING A PROBE MODEL BASED MACHINE VISION SYSTEM

(71) Applicants: Simon Barker, Sudbury, MA (US);
Adam Wagman, Wilmington, MA (US);
Aaron Wallack, Natick, MA (US);
David J Michael, Wayland, MA (US)

(72) Inventors: Simon Barker, Sudbury, MA (US);
Adam Wagman, Wilmington, MA (US);
Aaron Wallack, Natick, MA (US);
David J Michael, Wayland, MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 13/733,685

(22) Filed: Jan. 3, 2013

(65) Prior Publication Data
US 2013/0182948 A1    Jul. 18, 2013

Related U.S. Application Data

(63) Continuation of application No. 12/249,318, filed on Oct. 10, 2008, now Pat. No. 8,457,390.

(51) Int. Cl.
*G06K 9/62*    (2006.01)

(52) U.S. Cl.
CPC .................................... *G06K 9/6256* (2013.01)
USPC ............ 382/159; 382/181; 382/155; 382/209

(58) Field of Classification Search
CPC ..... G06K 9/6256; G06K 9/66; G06K 9/6217; G06K 9/6282; G06F 17/30256
USPC ......................................... 382/155, 159, 161
See application file for complete search history.

(56) References Cited

U.S. PATENT DOCUMENTS

| 5,842,194 | A | 11/1998 | Arbuckle |
| 6,005,978 | A | 12/1999 | Garakani |
| 6,181,438 | B1 | 1/2001 | Bracco et al. |
| 7,016,539 | B1 | 3/2006 | Silver et al. |
| 7,065,262 | B1 | 6/2006 | Silver et al. |
| 2002/0057843 | A1 | 5/2002 | Matsubara |
| 2006/0173560 | A1 | 8/2006 | Widrow |
| 2012/0148163 | A1* | 6/2012 | Kido .............................. 382/199 |

* cited by examiner

*Primary Examiner* — Edward Park
(74) *Attorney, Agent, or Firm* — Quarles & Brady LLP

(57) ABSTRACT

A method for training a pattern recognition algorithm including the steps of identifying the known location of the pattern that includes repeating elements within a fine resolution image, using the fine resolution image to train a model associated with the fine image, using the model to examine the fine image resolution image to generate a score space, examining the score space to identify a repeating pattern frequency, using a coarse image that is coarser than the finest image resolution image to train a model associated with the coarse image, using the model associated with the coarse image to examine the coarse image thereby generating a location error, comparing the location error to the repeating pattern frequency and determining if the coarse image resolution is suitable for locating the pattern within a fraction of one pitch of the repeating elements.

18 Claims, 12 Drawing Sheets

|   |   |   | 201 |   | 200 |   |
|---|---|---|---|---|---|---|
| 9 | 22 | 36 | 39 | 42 | 56 |
| 12 | 34 | 39 | 79 | 69 | 34 |
| 13 | 54 | 62 | 99 | 48 | 32 |
| 12 | 56 | 56 | 68 | 87 | 23 |
| 9 | 22 | 54 | 43 | 45 | 21 |
| 9 | 12 | 32 | 23 | 23 | 10 |

Fig. 7

METHOD AND APPARATUS FOR TRAINING A PROBE MODEL BASED MACHINE VISION SYSTEM

CROSS-REFERENCE TO RELATED APPLICATIONS

This application is a continuation of U.S. application Ser. No. 12/249,318 which was filed on Oct. 10, 2008 and which is titled "Method and Apparatus for Training a Probe Model Based Machine Vision System".

STATEMENT REGARDING FEDERALLY SPONSORED RESEARCH OR DEVELOPMENT

Not applicable.

BACKGROUND OF THE INVENTION

The present invention is related to training algorithms for machine vision systems and more specifically to an iterative process that generates an optimal machine vision process for recognizing a pattern in images.

One task performed by many machine vision systems is to attempt to identify the location and orientation of a pattern of interest within images. Several different classes of algorithms have been developed to perform this pattern locating task.

One advantageous class of such algorithms uses a model to represent the pattern of interest which includes a plurality of probes. Each probe is a measure of similarity of a run-time image feature or region to a pattern feature or region at a specific location. The plurality of probes is applied at a plurality of poses to the run-time image and the information from the probes at each pose is used to determine the most likely poses of the pattern in the run-time image. The individual probes may be as described in U.S. Pat. No. 7,016,539 which is titled "Method For Fast, Robust, Multi-dimensional Pattern Recognition" which issued on Mar. 21, 2006 and which is incorporated herein by reference in its entirety, or could be something different, for example normalized correlation. Hereafter this class of pattern matching algorithms will be referred to as probe model algorithms.

To speed up the pattern recognition process, at least some probe model algorithms use a set of models corresponding to different image resolutions to iteratively determine the pose of a pattern in an image. For instance, an algorithm may include five different models where each model is for a different resolution of image. Here, during the pattern recognition process, a coarse resolution and associated model may be used initially to identify a coarse approximated pose of an instance of a pattern in an image. Thereafter, a relatively finer resolution may be used to more precisely identify the pose of the pattern instance in the image. This iterative process continues until a finest resolution model is used and the precise pose of the pattern instance is identified.

For probe model algorithms to work properly, robust models need to be developed during a model training process for each pattern to be recognized within an image. Known model training algorithms have several shortcomings. For instance, in some cases a training algorithm will select an initial image resolution for subsequent recognition processes that may not work properly. In another instance the user may manually enter an initial image resolution that may also not work properly. To this end, in lower resolution images, pattern features that are detectable when a pattern is aligned in one juxtaposition with respect to a camera may disappear when the pattern is aligned slightly differently with the camera due to sub-pixel phase shift. Where an image resolution is selected during a training process with a camera aligned in one juxtaposition with respect to the camera, if the pattern is misaligned slightly during a subsequent recognition process, the pattern pose may not be precisely determinable.

As another instance, while models developed using known model training processes work well for recognizing instances of some patterns of interest, experience has shown that known training processes can generate non-robust or less than optimal models for some types of patterns. One pattern type that known model training processes are often unable to generate robust models for includes patterns that have repeating elements such as the pattern that results when a ball grid array is imaged. To this end, at least some existing model training processes use a training image to generate a series of images of a training pattern at different image resolutions. The processes then collect statistics pertaining to the spatial distribution of edges in each image in the series known as weights. The processes then pick a maximum coarse image resolution for the model based on the circular moment of inertia of these weights with a compensating factor for scale. Here, the compensating factor ensures that the process does not always select a finer image resolution because the edges are more disparate. These processes tend to select maximum image resolutions such that the trained models contain relatively straight or slowly curving long chains of strong edges that are at a distance from the model center.

When one of the training processes described above is used to develop models and a model sequence to be used during a subsequent pattern recognition process where the pattern to be recognized includes repeating elements, the resulting recognition process often results in identification of an incorrect pose (i.e., a pose where the detected pattern instance is misaligned with the actual pattern instance in the image).

Thus, it would be advantageous to have a better recognition system training process for selecting an optimal initial model including an optimal initial resolution for use during subsequent recognition processes.

BRIEF SUMMARY OF THE INVENTION

At least some embodiments of the present invention include a method for selecting a coarse image resolution or resolutions at which probe models may be trained from an image of a pattern. The model(s) can then be used at run-time where the models will be applied to different images at the selected resolutions to determine the approximate poses of occurrences of the training pattern in those images. To this end, lower resolution images will be generated from both the training image and all run-time images using a methodology that is well known in the literature and requires that all or much of the energy in the original image above the Nyquist frequency be removed by applying an anti-aliasing filter prior to actual sub-sampling.

In other embodiments the lower-resolution images might be generated from multiple full resolution images.

A criterion for selecting the coarse resolution or resolutions is that the pattern can be located with sufficient accuracy at the coarse resolution or resolutions to allow subsequent refinement steps of the algorithm to take these hypothetical occurrences and their associated poses and discover the exact poses of all instances of the training pattern within the images. Two further criteria are that the process hypothesizing occurrences and their approximate poses will not miss any real instances of the pattern and that the refinement step will not be overwhelmed with so many coarse resolution hypotheses as to cause the pattern location process to take a prohibitively long time.

To this end, in at least some embodiments the invention trains models at each of the possible coarse resolutions and tests these models using the training image to ascertain whether the models meet the prescribed criteria. In addition, the invention selects a coarse resolution that both ensures the necessary accuracy and minimizes the amount of run-time computation.

In some embodiments the process of finding a pattern location using a trained probe based model entails applying the probes at a plurality of poses (which for example may vary in rotation, scale and aspect) at each possible location in the image. The result of this process is a collection of score-spaces in which peaks indicate a high correspondence between the image and model both at that particular xy location and the particular rotation, scale and aspect ratio at which the probes were applied.

Typically there is a one-to-one correspondence between the number of pixels in an image and score-space entries. However it had been recognized in previous probe based pattern location algorithms that it may not be necessary to evaluate the probe model at every possible pixel location in the image-space and thus the score-space may be, in this sense, under-sampled. In U.S. Pat. No. 7,016,539 the degree of under-sampling was defined by the "scan code", i.e. the scanning pattern over which the score-space was evaluated, where a full scan code implies generating scores at every pixel location, a half scan code implies evaluating scores at every other pixel location and a quarter scan code at only one out of every four pixels. Other scan codes are also contemplated (e.g. ninth scan code, etc.).

Under-sampling the score-space is different than examining a lower equivalent resolution image with a lower equivalent resolution probe model. Image resolution affects the appearance and existence of image features whereas this under-sampling the score space just means the probe model will not be evaluated at every pixel location in the image. However, as is the case for choosing a coarse image resolution where only a subset of the possible candidate image resolutions might be deemed suitably accurate for identifying instances of a particular pattern, a particular scan code may be required for location of an individual pattern. Thus, in at least some embodiments it is desirable that a training algorithm be capable of automatically identifying both a robust and a fast scan code to satisfy the constraints of the pattern location system.

The invention described here is multifaceted in that it may simply be used to select robust coarse image resolution at which to train and store a probe model. Another manifestation might instead select a scan-code at which to run a probe model. A further refinement might jointly select both an image resolution and a scan code.

Thus, in embodiments where an algorithm is simply selecting the best possible coarse image resolution and where an exemplary range of possible image resolutions is from 1 to $R_{max}$, then the selection of the coarsest image resolution of $R_{max}$ would allow the algorithm to run in the fastest time. However at an image resolution of $R_{max}$ the algorithm may not be able to find the pattern with sufficient accuracy or may not be able to locate the pattern at all, but at a finer resolution the algorithm, though slower, might be able to find the pattern with sufficient accuracy. To ascertain which image resolution is best, in one embodiment the invention may begin with a training image and convert this image to a resolution of $R_{max}$ and then train a probe model from the image resolution of $R_{max}$. The algorithm then tests the robustness (where robustness may be defined as locating the pattern in all test cases with sufficient accuracy) of this model and if deemed sufficiently robust will identify this image resolution as the coarsest possible image resolution and store this model and image resolution for use at run-time. If the resolution was found to not be robust, the original training image would be converted to a finer image resolution, for example at a resolution of $R_{max}-1$, and a model would be trained from the image resolution of $R_{max}-1$. The model corresponding to coarse resolution $R_{max}-1$ would then be tested and the iterative process of testing candidate resolutions would continue until arriving at a training pattern which is locatable with sufficient robustness, and this image resolution and the associated model and image resolution would be stored for later use.

In a further instance, where the range of possible image resolutions is from 1 to $R_{max}$ and scan codes are supported by a recognition system and include full, half and quarter, an exemplary fastest resolution/scan code combination may include an image resolution of $R_1$ and the quarter scan code meaning that during a pattern recognition process, after an initial image including a pattern is obtained, the image is converted to an image having an image resolution of $R_1$, a model associated with an image resolution of $R_1$ is used to generate a score space for the image and the score space is sampled using the quarter scan code to produce an initial pattern location estimate. Thereafter, the initial image may be converted to an image having an image resolution of $R_2$ where $R_2<R_1$, a model associated with an image resolution of $R_2$ may be used to generate a score space for the image and the score space may be sampled using a fastest robust scan code associated with the image resolution of $R_2$ to more precisely identify the pattern location. This iterative process continues until the precise pattern location is identified using the finest image resolution and associated model and scan code.

It has also been recognized that, in some embodiments, a similar process can be performed to identify at least one robust image resolution and the process may stop at that point. In other cases the process may continue until a plurality of robust resolutions or a plurality of robust image resolution and scan code combinations are identified and stored for subsequent use. The processes described herein may be used to develop recognition processes for use with any pattern type and is particularly useful for developing processes for use with patterns that have repeating elements such as a ball grid or the like.

Image resolutions need not be restricted to integer values and their progression in the testing sequence need not be linear. For example it might be useful to ensure more finer resolutions are tested and a sequence such as 1, 1.25, 1.5, 1.75, 2.0, 2.33, 2.66, 3.0, 3.5, 4.0, 5, 6, 7, etc. might be chosen.

In some cases finding the training pattern with sufficient accuracy might mean always finding the pattern within a translation tolerance dictated by the capabilities of further refinement steps of the pattern location system to be able to refine the coarse hypothesis of the location of the pattern to a higher specified level of accuracy. For example, a refinement step might be specified to be able to take hypotheses that were within plus or minus 3 pixels of the correct location of the instance of the pattern and find the correct location of the pattern in the image, in which case the sufficient accuracy for the coarse step would be plus or minus 3 pixels.

In further cases finding the training pattern with sufficient accuracy might mean always finding the pattern within spatial tolerance and within a tolerance in the further degrees of freedom of rotation, scale, shear and aspect, or some combination of these degrees of freedom.

In a further case finding the training pattern with sufficient accuracy might mean always finding the pattern within a translation tolerance dictated by the frequency of repeating features within the training pattern. For example, if the training image was a ball grid array and the balls were spaced at a distance of 10 pixels then sufficient accuracy might be defined to be a fraction of this distance, for example one half of the pitch of the ball grid array or 5 pixels.

In a still further case finding the training pattern with sufficient accuracy might mean always finding the pattern within translation tolerance dictated by the frequency content of the training pattern. For example, if a strong peak in the frequency spectrum of the training image occurred at 0.05 cycles per pixel (i.e. a cycle length of 20 pixels) then sufficient accuracy might be defined to be a fraction of this cycle length, for example 0.4 times this cycle length or 8 pixels.

In a further case finding the training pattern with sufficient accuracy might be defined as finding the pattern with a tolerance comprising any combination of the above definitions or other definitions.

In the embodiment where the sufficient accuracy included always finding the pattern within translation tolerance dictated by the frequency of repeating features within the training pattern some embodiments of the invention might discover this frequency by (a) training a probe model at the full or finest image resolution, (b) using this model to generate a score space, (c) identifying the peak pertaining to the true pattern position in the training image within this score-space, (d) identifying the closest significant other peak to the peak pertaining to the true pattern position in the training image within this score-space, and (e) measuring the distance between these two peaks as the distance between repeating features within the training pattern, the reciprocal of which would be the repeating pattern frequency. The measure of sufficient accuracy for verifying that a probe model is capable of locating the pattern in an image at a particular image resolution might be that it must be able to locate the pattern within a fraction of the measured repeating pattern distance. In some cases the fraction is less than 60 percent. In some cases the threshold percentage is less than 35 percent.

In some cases the verification of a probe model trained at particular image resolution includes (a) generating a set of images at that particular lower resolution and also at different coarse subpixel phases to form a set of test images, (b) using the trained model associated with the lower image resolution to locate the training pattern in each of the test images, (c) measuring the location error for each of the test images, and (d) observing whether all of these measured location errors fall within the bounds dictated by the algorithm's definition of sufficient accuracy, which may be a percentage of the repeating pattern frequency or a different definition of sufficient accuracy.

In some other cases the verification of a probe model trained at a particular image resolution might include generating an alternative set of test images that might include those generated at a particular set of transforms (e.g. a set of rotations angles or a set of scale changes). Such an alternate set of test images might also be generated at different coarse subpixel phases at for example each of the different rotation angles.

In some embodiments verification of suitability of a probe model trained at a particular image resolution might further include the steps of (a) specifying a minimum number of probes that are required for a probe model covering a particular image area, (b) training probe models at each candidate image resolution, and (c) determining if the model has at least the minimum number of probes.

In some embodiments of the invention, verification of suitability of a probe model at a particular image resolution might also include finding the sparsest robust scan code for that model. In some cases the step of identifying the sparsest robust scan code for a particular image resolution includes (a) generating from the training image an image at the particular image resolution, (b) training a probe model at the particular image resolution, (c) applying the probe model at the particular resolution to the image at the particular resolution while using a mode of operation including the use of a full scan code to generate a score space for the model applied to that image and (d) analyzing the obtained score space to ascertain whether one or more sparse scan codes would be robust in robustly detecting and accurately locating the pattern associated with the trained model.

Because a scan code other than the full scan code implies by definition a sparse evaluation of a probe model's score space it is possible that the score corresponding to the true location of the pattern within the image will not be evaluated. In this case, depending on the particular scan code employed, a combination of the scores around the true location would be observed by the algorithm. For example, if a half scan code is used, then every other location in the score space is evaluated and thus the worst case score for the true location would be the highest score of the four nearest neighbors of the score at the true location.

Thus in some cases the step of analyzing the obtained score space to ascertain whether a particular scan code would be robust in detecting and accurately locating the pattern associated with the trained model might comprise (a) identifying a worst case score that would be obtained when using the particular scan code by the probe model when applied at the true location of the trained pattern within the image, (b) comparing this lowest score to a highest other score within the score space outside the region pertaining to the true peak and, (c) where the worse case peak score is greater than a threshold percentage of the highest other score, identifying the additional scan code as a possible sparsest robust scan code for the image resolution.

In some cases the threshold percentage is greater than 100 percent.

In some cases the region surrounding the true peak outside of which the maximum other score is observed might be defined to be a 3×3 region. In other cases the region may be defined differently.

An objective of some embodiments of the invention is to train a probe model at an image resolution and/or scan code combination that can find with sufficient robustness the location of the training pattern in test images where the model facilitates the fastest possible speed of execution. In embodiments where only image resolution is selected, the coarsest resolution that ensures the location of the training pattern in test images with sufficient robustness is the optimum choice. In embodiments that only select the scan code, the most sparse scan code that ensures the location of the training pattern in test images with sufficient robustness is the optimum choice. In some cases a higher resolution model with a sparser scan code may run faster than a coarser resolution model with a less sparse scan code. For example, a probe model trained at an image resolution of 10 and using a half scan code may well run slower than a probe model trained at an image resolution of 8 using a quarter scan code.

In such a case the steps for finding the best combination of image resolution and scan code might include, starting with the coarsest image resolution as the 'proposed' image resolution and (a) generating a lower resolution image at the proposed image resolution from the full resolution training image, (b) using the image at the proposed image resolution to train a probe model, (c) running the probe model on the image at the proposed image resolution to generate a score space and a location error, (d) using the location error to determine if the test image resolution is sufficiently accurate in locating the pattern within a fraction of one pitch of the repeating elements or other suitable tolerance, (e) where the proposed image resolution is deemed to be sufficiently robust, using the score space to identify a sparsest robust scan code for the proposed image resolution where the proposed image resolution and sparsest robust scan code comprise a proposed image resolution and scan code combination, (f) storing the proposed image resolution and scan code combination for use in subsequent pattern location processes as a stored image resolution/scan code combination, (g) determining if a less coarse image resolution and more sparse scan code combination could be faster than the stored image resolution/scan code combination, (h) where a less coarse image resolution and more sparse scan code combination cannot be faster than the stored image resolution/scan code combination, ending the process and (i) where a less coarse image resolution and more sparse scan code combination could be faster than the stored image resolution/scan code combination, repeating steps (a) through (h) using a less coarse proposed image resolution and only scan codes that would allow faster execution at the proposed less coarse image resolution than the stored image resolution/scan code combination.

Some embodiments further include the step of using the full resolution training image to generate a set of test images at a particular lower resolution with different subpixel phases and wherein steps (c) through (e) are performed for each of the lower resolution images in this set. Further embodiments might include extending the set of test images to include those generated at various combinations of rotation, scale, shear and aspect in addition to sub pixel phase. Such an embodiment might also include in its definition pattern location error, discrepancies in rotation, scale, shear and aspect between the true instance of the pattern in the test image and that determined by applying the trained probe model to the test image.

In a further embodiment of the invention, the invention may be used to generated a selected coarse image resolution or resolutions and/or sparse scan codes and these may then be stored for later manual entry in a run-time pattern recognition or pattern location system.

Consistent with the above comments, some embodiments of the invention include a method for training a pattern recognition algorithm for a machine vision system that uses models of a pattern to be located, the method comprising the steps of training each of a plurality of models using a different training image wherein each of the training images is a version of a single image of the pattern at a unique image resolution, using the models to identify at least one robust image resolution where the resolution is suitable for locating the pattern within an accuracy limit of the actual location of the pattern in the image and storing the at least one robust image resolution for use in subsequent pattern recognition processes.

In some cases each model includes a plurality of probes that are each a measure of similarity of at least one of a run-time image feature and a run time image region to at least one of a pattern feature and a pattern region, respectively, at a specific location, the method further including the steps of applying the plurality of probes at a plurality of poses to the run-time image resulting in a plurality of score spaces at each pose where the score spaces include peaks, the peaks indicating likely locations of occurrences of the pattern in the run-time image at each pose and comparing the score-space peaks to an accept threshold where the results of the comparison are used to identify the poses of instances of the model in the image.

In some cases the pattern recognition algorithm searches for the pattern in a translation degree of freedom and at least one further degree of freedom.

In some cases the step of using the models to identify at least one robust image resolution that is suitable for locating the pattern within an accuracy limit of the actual location of the pattern in the image includes using the models to identify at least one image resolution usable to find the pattern within an accuracy limit that at least one of (i) is a function of the capabilities of further refinement steps of the recognition algorithm to be able to refine the location of the pattern to a higher level of accuracy; (ii) is within a spatial, a rotation, a scale, a shear and an aspect degree of freedom; (iii) is a function of the frequency content of the training pattern and (iv) any combination of (i) through (iii) above.

In some cases the step of using the models to identify at least one robust image resolution where the robust image resolution is suitable for locating the pattern within an accuracy limit of the actual location of the pattern in the image includes using different models associated with different image resolutions to examine images until at least one robust image resolution is identified and wherein the order of models used includes one of (i) starting with a coarse resolution model and linearly progressing to finer resolution models via integers; (ii) starting with one resolution and progressing in a non-linear fashion to other resolutions; and (iii) using at least some non-integer resolutions.

In some cases the step of using the models to identify at least one robust image resolution where the robust image resolution is suitable for locating the pattern within an accuracy limit of the actual location of the pattern in the image includes generating a plurality of test images at the robust image resolution, each test image characterized by a different combination of degrees of freedom where the degrees of freedom include at least a sub-set of rotation, shear, aspect and scale values and applying the model to each of the plurality of test images to determine if pattern location is identified within the accuracy limit of the actual location of the pattern in the images.

In some cases the method further includes the step of providing the robust image resolution for manual entry into a run-time pattern recognition system. In some cases the method further includes the step of providing the robust image resolution/scan code combination for manual entry into a run-time pattern recognition system.

Some embodiments further include the step of identifying at least one image resolution and scan code combination where the image resolution is suitable for locating the pattern within the accuracy limit of the actual location of the pattern in the image and the scan code is robust at the image resolution in the image resolution/scan code combination, the step of storing the at least one robust resolution including storing at least one robust image resolution and scan code combination. In some cases the pattern includes repeating elements and wherein the step of using the models to identify at least one robust image resolution includes using the models to identify at least one image resolution where the image resolution is suitable for locating the pattern within a fraction of one pitch of the repeating elements.

Some embodiments include an apparatus for training a pattern recognition algorithm for a machine vision system that uses models of a pattern to be located, the apparatus comprising a processor programmed to perform the steps of, training each of a plurality of models using a different training image wherein each of the training images is a version of a single image of the pattern at a unique image resolution, using the models to identify at least one robust image resolution where the image resolution is suitable for locating the pattern within an accuracy limit of the actual location of the pattern in the image and storing the at least one robust image resolution for use in subsequent pattern recognition processes. In some cases each model includes probes that each represent a relative position at which a test is to be performed in an image at a given pose where the algorithm compares the models with run time images at each of a plurality of poses and computes a match score at each of the poses thereby providing a match score space which is compared to an accept threshold where the results of the comparison are used to identify the poses of instances of the model in the image.

In some cases the processor is further programmed to perform the step of identifying a fastest image resolution and scan code combination where the image resolution is suitable for locating the pattern within the accuracy limit of the actual location of the pattern in the image and the scan code is robust at the image resolution in the image resolution/scan code combination, the processor programmed to perform the step of storing the at least one robust image resolution by storing at least one robust image resolution and scan code combination. In some cases the pattern includes repeating elements and wherein the processor is programmed to perform the step of using the models to identify at least one robust image resolution by using the models to identify at least one image resolution where the image resolution is suitable for locating the pattern within a fraction of one pitch of the repeating elements.

In some cases the processor is further programmed to perform the step of identifying the known location of the pattern within an image and wherein the processor is programmed to perform the step of using the models to identify the fastest combination by using a first model associated with a finest image resolution to generate a first score space for a first image, examining the first score space to identify a repeating pattern frequency, for each of the other models associated with different resolutions, using the model to generate an additional score space and a location error, the location error indicating the difference between the known location and a location determined using the additional score space, where the location error is less than a threshold percentage of the repeating pattern frequency, identifying the image resolution as a possible image resolution for the fastest image resolution and scan code combination.

In some cases the processor is programmed to perform the step of using the model to generate an additional score space by generating a set of lower resolution images at different coarse subpixel phases and using the model associated with the image resolution to generate a separate additional score space and a location error for each of the lower resolution images, the processor programmed to perform the step of identifying the image resolution as a possible image resolution for the fastest image resolution and scan code combination by identifying the image resolution as a possible image resolution for the fastest image resolution and scan code combination when each of the location errors generated using the model is less than a threshold percentage of the repeating pattern frequency. In some cases the processor is programmed to perform the step of using the models to identify the fastest image resolution and scan code combination by, for each of the possible resolutions, identifying the sparsest robust scan code.

In some cases the processor is programmed to perform the step of identifying the sparsest robust scan code for a particular image resolution by examining the additional score space generated using the model associated with the image resolution using at least one additional scan code that is more sparse than the full scan code to determine if the additional scan code is robust at the particular image resolution. In some cases the processor is programmed to perform the step of using the additional scan code to examine the score space by identifying a peak score in the score space, identifying a worse case peak score in a scan region centered on the peak score in the score space, comparing the worst case peak score to a highest other score within the score space outside the scan region and, where the worse case peak score is greater than a threshold percentage of the highest other score, identifying the additional scan code as a possible sparsest robust scan code for the image resolution. In some cases the additional scan code includes at least one of a quarter scan code and a half scan code.

In some cases the processor is programmed to perform the steps of training, using and storing by, starting with a coarse image having a coarse image resolution where the coarse image resolution is a test image resolution (a) using the image at the test image resolution to train a model, (b) running the model on the image at the test image resolution to generate a score space and a location error, (c) using the location error to determine if the test image resolution is suitable for locating the pattern within a fraction of one pitch of the repeating elements, (d) where the test image resolution is suitable for locating the pattern within a fraction of one pitch of the repeating elements, using the score space to identify a sparsest robust scan code for the test image resolution where the test image resolution and sparsest robust scan code comprise a test image resolution and scan code combination, (e) storing the test image resolution and scan code combination for use in subsequent pattern recognition processes as a stored image resolution/scan code combination, (f) determining if a less coarse image resolution and scan code combination could be faster than the stored image resolution/scan code combination, (g) where a less coarse image resolution and scan code combination cannot be faster than the stored image resolution/scan code combination, ending the process and (h) where a less coarse image resolution and scan code combination could be faster than the stored image resolution/scan code combination, repeating steps (a) through (g) using a less coarse test image resolution and only scan codes that could be faster at the less coarse test image resolution than the stored image resolution/scan code combination.

In some cases the processor is further programmed to perform the steps of identifying the known location of the pattern within a finest image resolution image, using an image at the finest image resolution to train a model, using the model associated with a finest image resolution to generate a score space and examining the score space to identify a repeating pattern frequency, the processor programmed to perform the step of using the location error to determine if the test image resolution is suitable for locating the pattern within a fraction of one pitch of the repeating elements by comparing the location error to a threshold percentage of the repeating pattern frequency and when the location error is less than the threshold percentage of the repeating pattern frequency, determining that the test image resolution is suitable for locating the pattern within a fraction of one pitch of the repeating elements.

In some cases the processor is programmed to perform the step of using the models to identify at least one robust image resolution that is suitable for locating the pattern within an accuracy limit of the actual location of the pattern in the image by using the models to identify at least one image resolution usable to find the pattern within an accuracy limit that at least one of (i) is a function of the capabilities of further refinement steps of the recognition algorithm to be able to refine the location of the pattern to a higher level of accuracy; (ii) is within a spatial, a rotation, a scale, a shear and an aspect degree of freedom; (iii) is a function of the frequency content of the training pattern and (iv) any combination of (i) through (iii) above.

In some cases the processor performs the step of using the models to identify at least one robust image resolution where the robust image resolution is suitable for locating the pattern within an accuracy limit of the actual location of the pattern in the image by using different models associated with different image resolutions to examine images until at least one robust image resolution is identified and wherein the order of models used includes one of (i) starting with a coarse resolution model and linearly progressing to finer resolution models via integers; (ii) starting with one resolution and progressing in a non-linear fashion to other resolutions; and (iii) using at least some non-integer resolutions.

In some cases the processor performs the step of using the models to identify at least one robust image resolution where the robust image resolution is suitable for locating the pattern within an accuracy limit of the actual location of the pattern in the image by generating a plurality of test images at the robust image resolution, each test image characterized by a different combination of degrees of freedom where the degrees of freedom include at least a sub-set of rotation, shear, aspect and scale values and applying the model to each of the plurality of test images to determine if pattern location is identified within the accuracy limit of the actual location of the pattern in the images.

In some cases the processor is further programmed to provide the robust image resolution for manual entry into a run-time pattern recognition system. In some cases the processor is further programmed to providing the robust image resolution/scan code combination for manual entry into a run-time pattern recognition system.

Still other embodiments include an apparatus for training a pattern recognition algorithm for a machine vision system that uses models of a pattern to be located, the apparatus comprising a processor programmed to perform the steps of (a) identifying the known location of the pattern that includes repeating elements within a finest image resolution image, (b) using the finest image resolution image to train a model, (c) using the model to examine the finest image resolution image and to generate a score space, (d) examining the score space to identify a repeating pattern frequency, (e) using a coarse image at a coarse image resolution that is coarser than the finest image resolution image to train a model, (f) using the model associated with the coarse image to examine the coarse image thereby generating a location error, (g) comparing the location error to the repeating pattern frequency, and (h) based on the comparison, determining if the coarse image resolution is suitable for locating the pattern within a fraction of one pitch of the repeating elements.

In some cases the processor is programmed to further perform the steps of using the coarse image to generate a plurality of lower resolution images at different coarse subpixel phases and wherein steps (f) through (h) are performed for each of the lower resolution images.

Other embodiments include an apparatus for training a pattern recognition algorithm for a machine vision system that uses models of a pattern to be located, the apparatus comprising a processor programmed to perform the steps of (a) identifying the known location of the pattern that includes repeating elements within a finest image resolution image, (b) using the finest image resolution image to train a model, (c) using the model to examine the finest image resolution image and to generate a score space, (d) using a coarse image at a coarse image resolution that is coarser than the finest image resolution image to train a model, (e) using the model associated with the coarse image to examine the coarse image thereby generating a score space and (f) examining the score space to identify a sparsest scan code that is robust at the coarse image resolution.

In some cases the processor is programmed to further perform the steps of using the coarse image to generate a plurality of lower resolution images at different coarse subpixel phases and wherein steps (e) and (f) are performed for each of the lower resolution images.

Other embodiments include a method for training a pattern recognition algorithm for a machine vision system that uses models of a pattern to be located, the method comprising the steps of generating a test image at a fine image resolution, using the test image to generate a plurality of images where each of the plurality of images is at a different test image resolution, generating lower resolution images for each of the plurality of images, at each of a plurality of the test image resolutions, using a model to examine the lower resolution images to identify location errors and selecting at least one test image resolution for which location is resolved within an accuracy limit of the actual location of the pattern within the test image.

In some cases the step of selecting at least one image resolution includes selecting a sub-set that includes at least two test resolutions. In some cases the step of selecting at least one image resolution includes selecting at least the fastest image resolution for which location is resolved within the accuracy limit.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention can be employed. Other aspects, advantages and novel features of the invention will become apparent from the following detailed description of the invention when considered in conjunction with the drawings.

BRIEF DESCRIPTION OF THE SEVERAL VIEWS OF THE DRAWINGS

FIG. 7 is a schematic illustrating an exemplary region of a score space to be analyzed during full and half-scan examination processes in FIG. 6;

Figure 1:
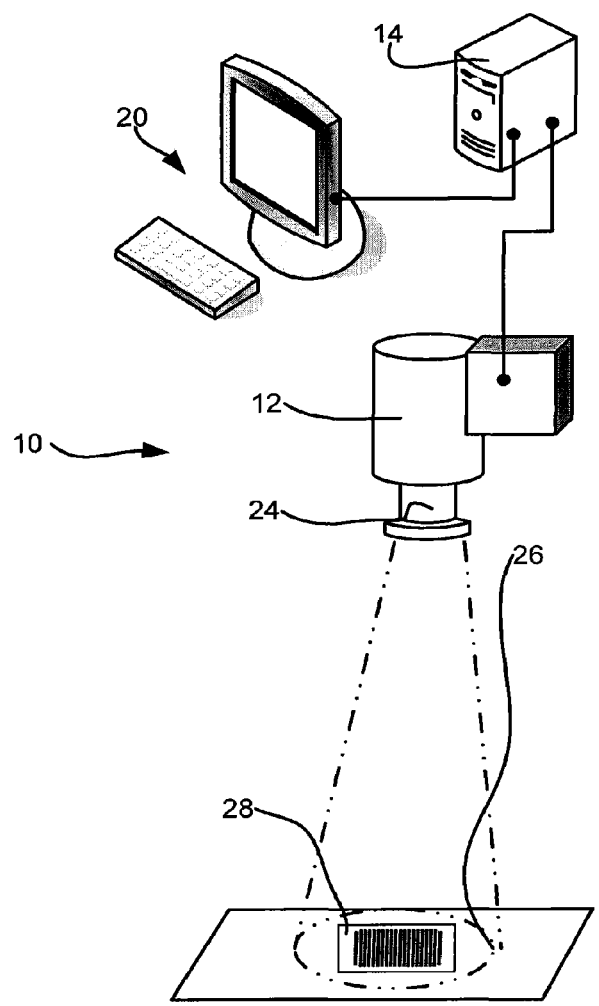
FIG. 1 is a schematic illustrating an exemplary machine vision system including a computer that may run a pattern recognition training program that is consistent with at least some aspects of the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

The various aspects of the subject invention are now described with reference to the related figures, wherein like numerals refer to like or corresponding elements throughout. It should be understood, however, that the drawings and detailed description relating thereto are not intended to limit the claimed subject matter to the particular form disclosed. Rather, the intention is to cover all modifications, equivalents, and alternatives falling within the spirit and scope of the claimed subject matter.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter.

Referring now to the drawings wherein like reference numerals correspond to similar elements throughout the several views and, more specifically, referring to FIG. 1, the present invention will be described in the context of an exemplary machine vision system 10 including a camera 12, a computer 14 that includes a processor and a human-machine interface 20 in the form of a computer display and optionally one or more input devices (e.g., a keyboard, a mouse, a track ball, etc.). Camera 12 includes, among other components, a lens 24 and a camera sensor element (not illustrated). Lens 24 includes a field of view 26 and focuses light from the field of view 26 onto the sensor element. The sensor element generates a digital image of the camera field of view and provides that image to a processor that forms part of computer 14. In at least some embodiments the camera sensor includes a two-dimensional CCD or CMOS imaging array as well known in the art.

Server 14 may be linked to one or more databases (not illustrated) that store programs run by server 14 and databases used by the programs run by the server. In addition to other programs, server 14 runs a pattern recognition training program that can be performed to, as the label implies, develop a pattern recognition process for locating a specific pattern within images generated by camera 12. More specifically, while server 14 may be able to run various pattern recognition training programs for generally recognizing patterns within images, consistent with various aspects of the present disclosure, server 14 can run a special recognition training program useable to develop a robust pattern recognition process for locating instances of patterns that include repeating elements within images. Hereafter, unless indicated otherwise, server 14 will be referred to as a processor 14.

Figure 2:
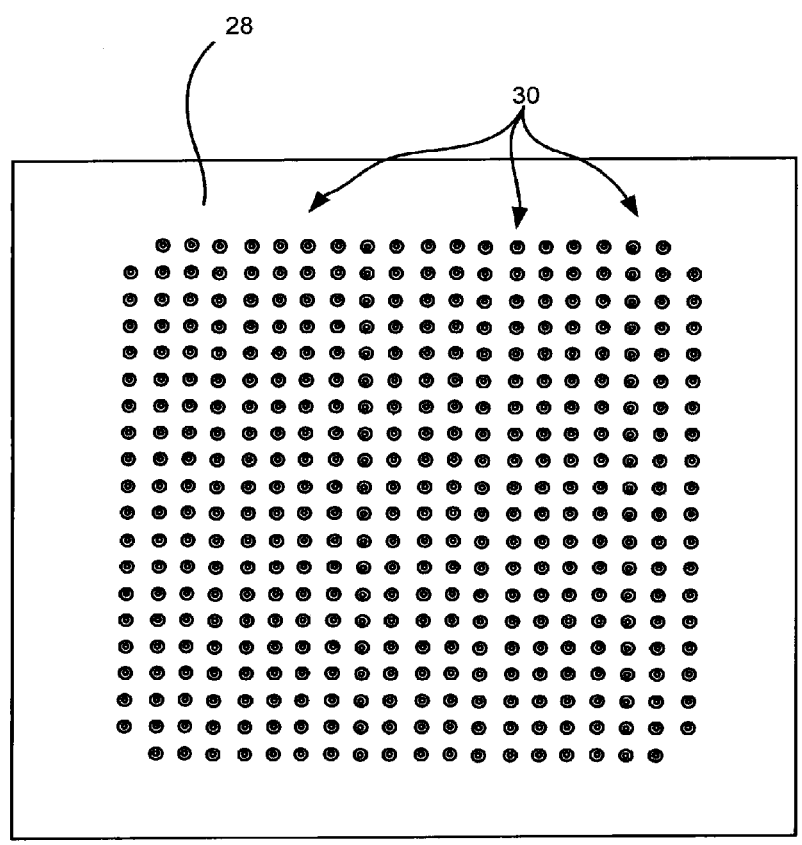
FIG. 2 is a top plan view of a repeating element ball grid pattern.

While the pattern recognition training programs or processes described herein may be used to develop processes particularly suitable for identifying instances of any patterns that have repeating elements, in order to simplify this explanation, the present invention will be described in the context of an exemplary repeating element ball grid pattern. To this end, referring now to FIG. 2, an image of an exemplary ball grid array 28 is illustrated that, as the label implies includes balls of solder 30 that are arranged in a grid including equi-spaced rows and columns. Clearly array 28 shown in FIG. 2 includes repeating elements within a pattern.

Referring once again to FIG. 1, interface 20 is linked to server 14 so that a system operator can, in at least some cases, interact with the pattern recognition training program to help develop the training program. To this end, for instance, when server 14 receives an initial training image of array 28 from camera 12, that initial image including the array pattern may be presented via interface 20 to the operator. Here, the operator may use one of the input devices to identify the pattern to be recognized during subsequent pattern recognition processes. Once a pattern is identified, the location of the pattern within the image generated by camera 12 is identified or is precisely known by the server 14 and can be stored for subsequent purposes.

In general, at least one pattern recognition training program contemplated by this disclosure uses a fine image resolution image generated by camera 12 to generate other coarser resolution images. Thereafter, the training program performs processes to determine which coarse images can be used to identify pattern locations accurately enough that subsequent finer image resolution images will be able to precisely identify the pattern location. In addition, where a coarse image resolution image can be used to identify pattern locations accurately enough, the program identifies a sparsest (i.e., fastest) robust scan code that can be used at the image resolution for generating a location estimate. The training program selects the fastest image resolution and scan code combination that is sufficiently robust and stores that combination as a starting point for subsequent pattern recognition processes.

U.S. Pat. No. 7,016,539 which is incorporated above by reference teaches an exemplary probe model algorithm or process that uses models of a pattern of interest to be found where each model includes a plurality of probes and each probe represents a relative position at which a test is to be performed in an image at a given pose. Each test contributes evidence that a pattern exists at the pose. The models are used to examine a run time image at each of a plurality of poses and to compute a match score at each of the poses thereby providing a match score space. The match scores are compared to an accept threshold and the results of the comparison are used to provide the locations of any instances of the model in the image. This patent should be referred to for details regarding models and how those models are used during a recognition process.

Figure 3:
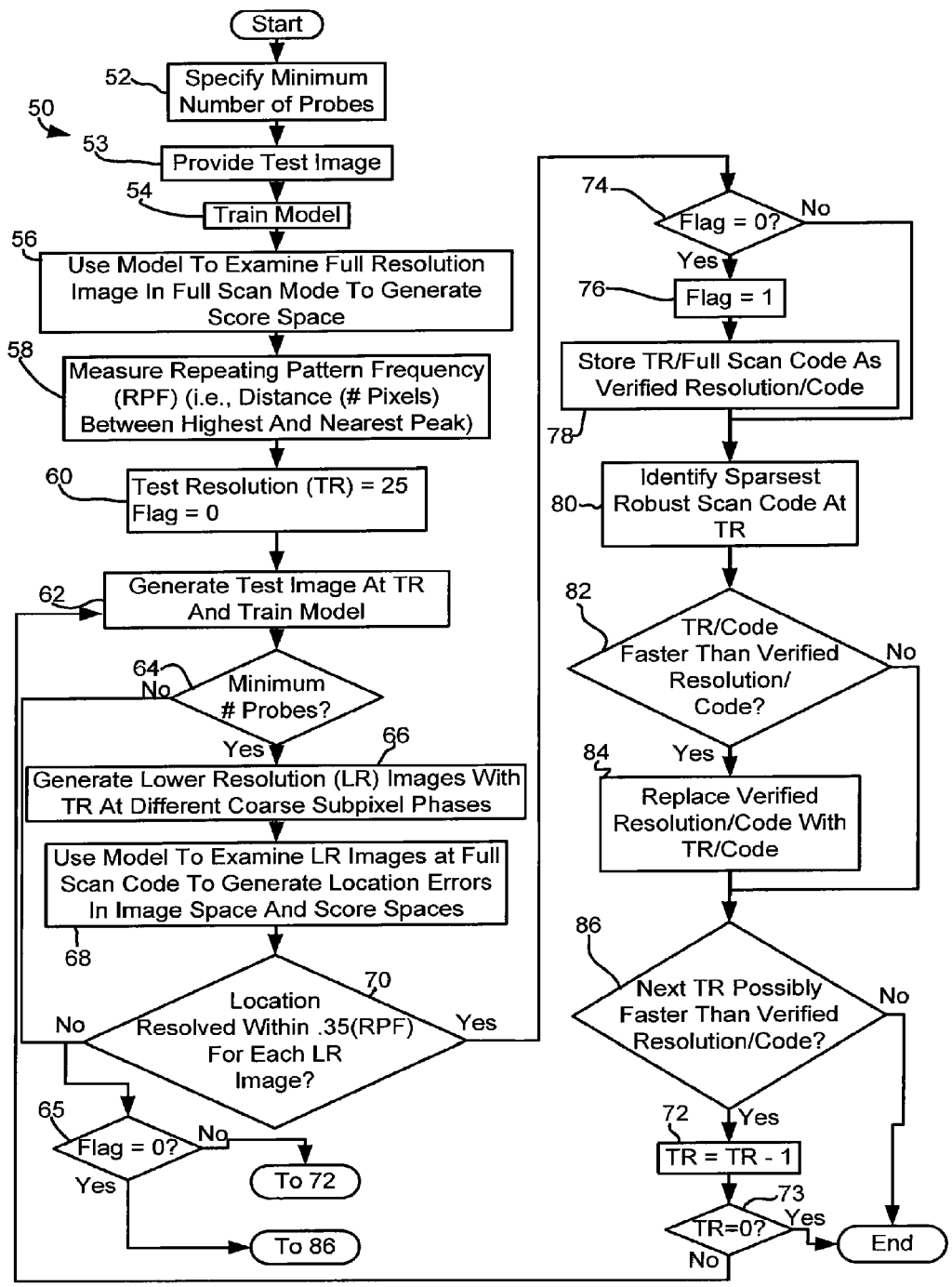
FIG. 3 is a flow chart illustrating an exemplary method that is consistent with the present disclosure for identifying a fastest image resolution and scan code combination for use in subsequent pattern recognition processes.

Referring now to FIG. 3, an exemplary pattern recognition training method 50 is illustrated that is consistent with at least some aspects of the present disclosure. Referring also to FIG. 1, at block 52 a system operator uses terminal 20 to specify a minimum number of probes that must be included in each model to be developed during the training program. Here, experience has shown that where a model includes too few probes, the model does not work properly in some cases. As a default, the minimum number of probes may be set to 64 but, in any event, should not be less than the number of pixels in an image (i.e., the width in pixels times the height in pixels) times 64 divided by 10,000 in at least some embodiment. At block 53, camera 12 is used to generate a test image of a ball grid array 28 where the test image has the finest possible image resolution. At block 54, server 14 trains or generates a model for the finest image resolution test image in a manner consistent with that described in U.S. Pat. No. 7,016,539 which is incorporated above.

Figure 4:
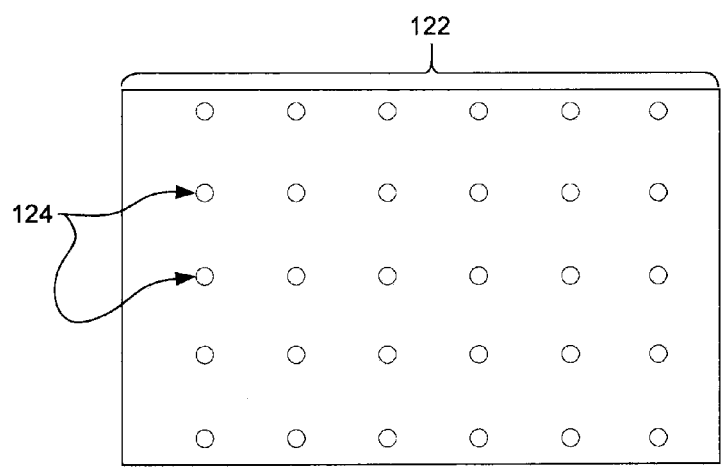
FIG. 4 is a schematic illustrating an exemplary score space that may be generated during a portion of the process shown in FIG. 3.

Referring still to FIGS. 1 and 3, at block 56, processor 14 uses the trained model to examine a full image resolution image in full scan mode to generate a score space as described in U.S. Pat. No. 7,016,539. Referring to FIG. 4, an exemplary score space 122 is illustrated where local peak values are identified by numeral 124. At block 58, a repeating pattern frequency (RPF) between a highest local peak score and a nearest peak in score space 122 is identified. Here, the repeating pattern frequency is identified by a possibly non-integer number of pixels between the highest and nearest peak scores. For example, an exemplary RPF may be 19 pixel within the score space 122.

Referring still to FIGS. 1 and 3, at block 60, a test image resolution (TR) is set equal to a maximum test image resolution that is supported by the processor 14. Here, it is assumed that processor 14 supports a range of image resolution between 1 and 25 and therefore, the maximum TR is set equal to 25 at block 60. In addition, a flag is set equal to zero at block 60. The flag in block 60 is used to store a first sufficiently accurate test image resolution and full scan code combination during subsequent steps in the process 50 as will be described in greater detail below.

Figure 5:
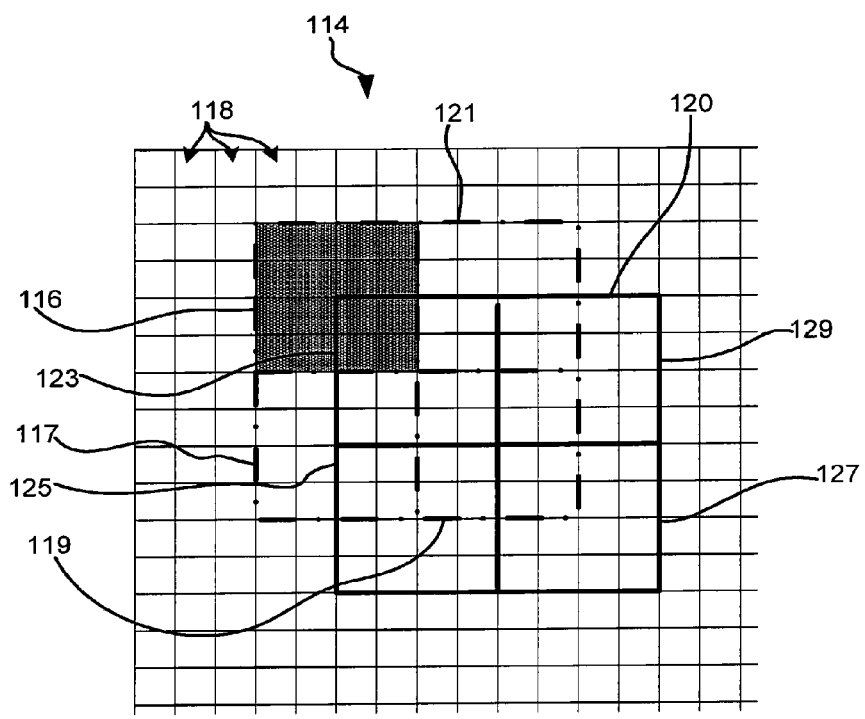
FIG. 5 is a schematic illustrating a sub-sampling process where lower resolution images are generated at a different coarse subpixel phases.

In FIG. 3, at block 62, processor 14 uses the test image from block 53 to generate a coarser test image at the current test image resolution (e.g., at a image resolution of 25 initially) and to build or train a model using that coarser test image. To this end, referring also to FIG. 5, a pixel raster 114 corresponding to a portion of an image is illustrated where the raster includes separate pixels, three of which are collectively identified by numeral 118. In FIG. 5, each of the small squares represents a separate pixel 118. To combine the pixels in an image to generate an image having a coarser image resolution, groups of adjacent pixels are combined. For example, to generate an image having a test image resolution of 4, the 16 pixels in box 116 (i.e., a 4×4 region) are combined to form a single pixel. Similarly, the 16 pixels in box 117 are combined into a single pixel, the 16 pixels in box 119 are combined into a single pixel and the 16 pixels in box 121 are combined into a single pixel. Where the test image resolution is 10 as opposed to 4, 100 pixel regions would be combined into a single pixel, and so on.

Referring still to FIG. 3, after a model has been trained for the test image resolution at block 62, control passes to block 64. At block 64, processor 14 determines whether or not the trained model includes a minimum number of probes (e.g., 64 in at least some embodiments). Where the trained model does not include a minimum number of probes, control passes to block 65 where the value of the flag set at block 60 is compared to zero. Here, where the flag is zero the process has yet to verify an image resolution/scan code combination that will work as a starting point for subsequent pattern recognition processes and therefore the process must continue and control passes to block 72 where the test image resolution TR is decremented by one or reduced by some suitable value. After block 72, the adjusted test image resolution TR is compared to one at block 73. Where the test image resolution is less than the original fine resolution which in most cases is one, the process ends. Where the test image resolution is greater than or equal to one, control passes back up to block 62 where the process continues as described above.

Referring still to FIG. 3, at block 65, where the flag is not zero (i.e., the flag is one), control passes to block 86 where processor 14 determines if the next test image resolution is possibly faster than the stored and verified image resolution/scan code combination. Where the next possible test image resolution could not possibly be faster than the stored/verified image resolution/code combination, the process ends. Where the next possible test image resolution could possibly be faster than the stored/verified image resolution/code combination, control passes on to blocks 72 and 73 described above. The loop including blocks 64, 65, 86, 72 and 73 continues until a model is trained at block 62 that includes the minimum number of probes.

Once a model includes a minimum number of probes at block 64, control passes to block 66 where processor 14 uses the finest resolution test image from block 53 to generate lower resolution images at different coarse subpixel phases at the current test image resolution. To this end, referring again to FIG. 5, where regions 116, 117, 119 and 212 correspond to a (0.0, 0.0) phase coarse image resolution image at a test image resolution of 4, the (0.50, 0.50) phase image at a test image resolution of 4 is phase shifted by one-half the test image resolution pixels along x and y axes and therefore would include 4×4 pixels corresponding to regions 123, 125, 127 and 129, among other regions. While various numbers of lower resolution images may be generated at block 66, in at least some embodiments the lower resolution images would include phases (0.25, 0.25), (0.25, 0.75), (0.75, 0.25), (0.75, 0.75) and (0.50, 0.50).

Referring still to FIGS. 1 and 3, at block 68 the model trained at block 62 for the current test image resolution is used to examine each of the lower resolution images at full scan code to generate location errors in the image space and a separate score space for each one of the lower resolution images. The location errors here would be specified as a possibly non-integer number of pixels. At block 70, processor 14 compares the location errors from block 68 to the repeating pattern frequency that was determined at block 58. Where each of the location errors is less than a threshold percentage of the repeating pattern frequency (i.e., less than a desired accuracy distance or accuracy limit), control passes up to block 74. Where any one of the location errors is greater than a threshold percentage of the repeating pattern frequency (i.e., is greater than a desired accuracy distance) at block 70, control passes to block 65 where a subset of the sequence of sub-processes including blocks 65, 86, 72 and 73 occur and control may pass back up to block 62. At block 70, the threshold percentage is selected to minimize or eliminate conditions in which the pattern location errors occur. In some embodiments, the threshold percentage may be as high as 60%. In particularly advantageous embodiments, it has been determined that the threshold percentage should be approximately 35% because, when the threshold is 35%, the test image resolution and related model are suitable for locating the repeating pattern within a fraction of one pitch of the repeating elements.

Here it should be appreciated that while one accuracy limit is represented by the expression in block 70, many other accuracy limits or error thresholds are contemplated and the inventions should not be limited to the specific expression unless so claimed. For instance, in some embodiments finding a pattern with sufficient accuracy may mean always finding a pattern within an accuracy limit dictated by the capabilities of further refinement steps of the pattern location system to be able to refine the coarse pattern location hypothesis to a higher level of accuracy. In other cases finding a pattern with sufficient accuracy might mean finding the pattern within a tolerance in any sub-set of various degrees of freedom including rotation, scale, shear and aspect. In still other cases finding a pattern with sufficient accuracy may mean finding the pattern within an accuracy limit dictated by the frequency content of the training pattern. In some cases a combination of the above definitions may be used to determine if sufficient accuracy occurs.

Referring still to FIGS. 1 and 3, at block 74, where the flag set at block 60 is still equal to zero, (i.e., the first time through block 74 during a pattern recognition training process), control passes to block 76 where the flag is reset to equal 1. Thus, the second time through block 74 during a training process, the flag will not equal zero and control will skip from block 74 down to block 80. At block 78, the test image resolution and full scan code are stored as a verified image resolution/code meaning that the current test image resolution and the full scan code can be used as a starting point for successfully identifying a repeating elements pattern in a subsequent pattern recognition process. As explained hereafter, the verified or stored image resolution/code stored at block 78 will be replaced by other image resolution/code combinations if other robust and faster combinations are identified during the remainder of the training process.

Continuing, at block 80, processor 14 identifies the sparsest robust scan code at the test image resolution. At block 82, processor 14 determines whether or not the test image resolution and the sparsest robust scan code at the test image resolution are faster than the verified or stored image resolution/code combination. Here, for instance, where the stored verified image resolution and scan data code combination includes an image resolution of 20 and a quarter-scan code, no image resolution/scan code combination having an image resolution less than 20 can be faster than the verified combination (if the sparsest scan code tested is quarter-scan). However, where the verified combination includes an image resolution of 20 and the full-scan code, at least some combinations including resolutions that are finer than 20 (i.e., less than 20) may be faster than the verified combination. For instance, a combination including an image resolution of 19 and either the half or quarter-scan code would be faster than the 20 image resolution/full-scan combination. As another instance, where the stored verified combination includes a test image resolution of 20 and the half-scan code, while a combination including image resolution of 19 and the full-scan code might be slower, a combination of 19 and the quarter-scan code might be faster. Where the current image resolution and sparsest robust scan code are not faster than the verified image resolution/code, control passes back to block 86 where, as described above, processor 14 determines if the next test image resolution could possibly be faster than the verified image resolution/code combination. Where the next image resolution cannot possibly be faster, the process ends. Where the next image resolution could possibly be faster than the verified image resolution/code, control passes to block 72 where the test image resolution is decreased by 1 after which control again passes to block 73. In other embodiments the image resolution may be decremented by 2 or more or by a non-integer value (e.g., a fraction).

Referring again to decision block 82, when the test image resolution and the sparsest robust scan code at the test image resolution are faster than the verified image resolution/code, control passes to block 84 where the verified image resolution/code is replaced by the test image resolution and fastest scan code associated therewith. After block 84 control passes to block 86.

Figure 6:
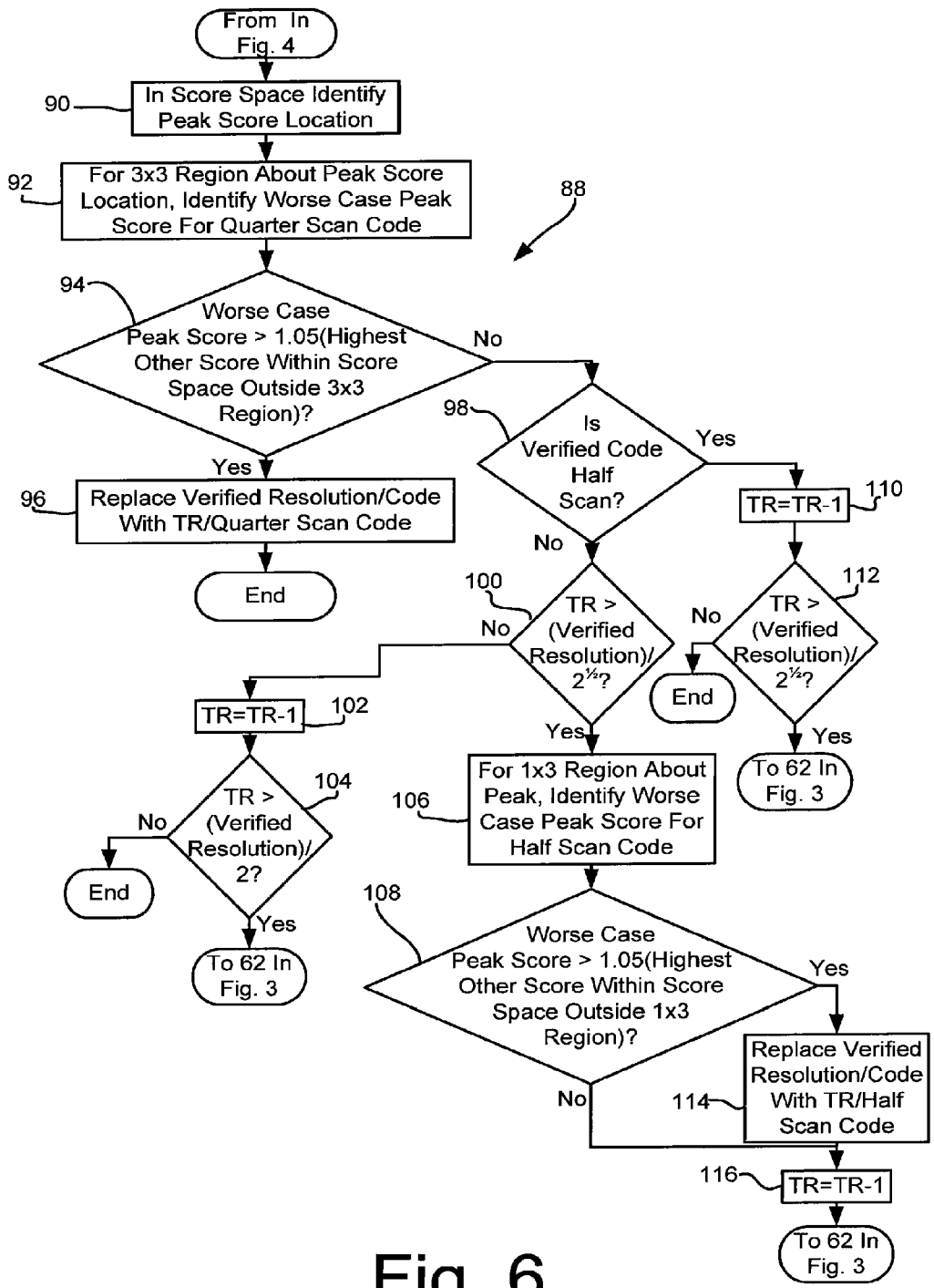
FIG. 6 is a sub-process that may be substituted for a portion of the process shown in FIG. 3 for identifying the sparsest robust scan code for a test image resolution.
Figure 7:
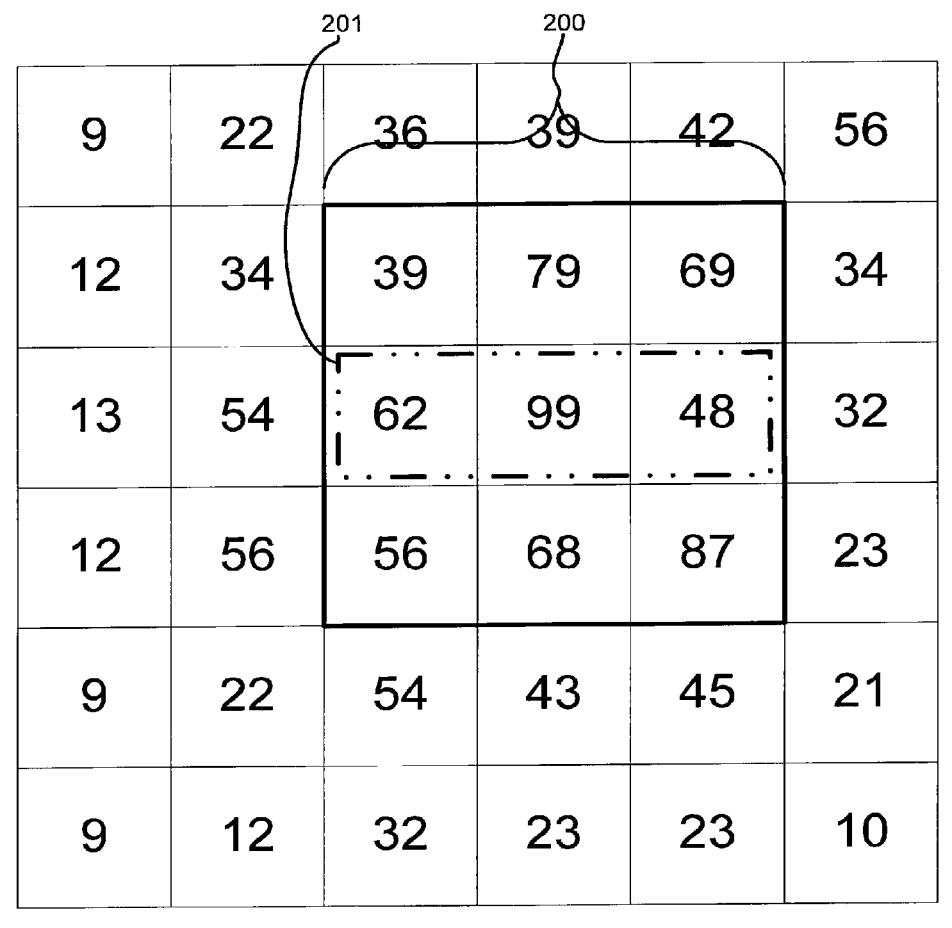

Referring now to FIG. 6, a sub-process 88 for identifying a sparsest robust scan code for a specific test image resolution and that may be substituted for blocks 80,82, 84 and 86 in FIG. 3 is illustrated. Referring also to FIGS. 1 and 3, after the control loop including block 74, 76 and 78, control passes to block 90 in FIG. 6. At block 90, for each one of the score spaces (see again FIG. 4) generated at block 68 for the lower resolution images generated at block 66, processor 14 identifies a peak score location. For example, referring to FIG. 7, a region from a score space where each location in the region includes a specific score is shown. For the purposes of the this explanation, it will be assumed that the score 99 in the center of 3×3 region 200 is the peak score in the entire score space where the score space would include a much larger region (see again exemplary larger score space 122 in FIG. 4) than the region shown in FIG. 7. Thus, at block 90 in FIG. 6, the location corresponding to score 99 would be identified. At process block 92, processor 14 identifies the 3×3 region 200 about the peak score location in the score space and identifies the worse case peak score for a quarter scan code. Referring again to FIG. 7, the 3×3 region examined at block 92 includes region 200 as illustrated. Here, if a quarter scan code were run on the region 200, every fourth location in the 3×3 region would be evaluated. Depending on where the 3×3 region fell within the coarse resolution image, a quarter scan evaluation might sample and evaluate score 99 or scores 62 and 48 or scores 79, 56 and 87 or scores 39, 69 and 68. Thus, with a quarter scan code the worst case peak score (i.e., the peak score in any one of the four sampling groups that is possible) would be 62.

Referring still to FIGS. 1 and 6, at block 94, the worst case peak score is compared to a threshold percentage of the highest other score within the score space outside the 3×3 region 200. Thus, in the example shown in FIG. 7, the worst case peak score 62 would be compared to a threshold percentage of the highest other score within the score space outside region 200. The threshold percentage in block 94 is selected so as to substantially ensure that the quarter scan code will be robust. In at least some embodiment, as shown in block 94, the threshold percentage is set to 105%. Thus, in the present example where the worst case peak score of 62 is greater than 105% of the highest other score within the score space outside region 200 and where similar conditions exist for each of the lower resolution images, control passes to block 96. At block 96, the verified image resolution/code is replaced with the current test image resolution and quarter scan code after which the process ends. Thus, any time a quarter scan code is verified as robust at block 94, that quarter scan code and its associated test image resolution will be the fastest image resolution/code combination that can be reliably used to start a pattern recognition process and the training process ends.

Referring still to FIGS. 1 and 6, at block 94 where the worst case peak score is less than 105% of the highest other score within the score space outside region 200, control passes to block 98. At block 98, processor 14 determines whether or not the verified code (i.e., the stored code which forms part of the verified image resolution/code combination) is the half-scan code. At block 98, because the process made it past block 94, it is known that the quarter scan code is not robust for the current test image resolution. It is also known that if a half-scan code was found robust for a coarser image resolution than the current test image resolution, the half-scan code should not be tested for the current test code image resolution because the combination will not be faster than the verified image resolution/code combination. Furthermore, the full scan code is slower than the half-scan code and therefore, if a half-scan code has been verified for a coarser image resolution than the current test image resolution, the full scan code should not be examined for the current test image resolution. For this reason, when the verified code is the half-scan code at block 98, control passes to block 110 where the test image resolution is decreased by 1 (or some other suitable value).

At block 112, processor 14 determines whether or not the current test image resolution is greater than the verified image resolution divided by $\sqrt{2}$. Here, we know that a quarter-scan code is two times faster than a half-scan code and four times faster than a full scan code. In addition, we know that a half-scan code is two times faster than a full scan code. Moreover, we know that an image resolution of two is four times faster than an image resolution of one and generally that an image resolution of g is $g^2$ faster than an image resolution of one. Thus, based on these known relationships, we know that an image resolution must be at least $\sqrt{2}$ times larger (coarser) for a half-scan to be faster than a quarter-scan. Thus, where the verified code is half-scan to continue on and to test the next finest test image resolution (i.e., the image resolution set at block 110) to see if a quarter-scan code is robust, the next test image resolution has to be greater than the verified image resolution (i.e., the stored image resolution that is associated with the verified or stored half-scan code) divided by $\sqrt{2}$. Where the next test image resolution is greater than the verified image resolution divided by $\sqrt{2}$ at block 112, control passes back up to block 62 in FIG. 3 where the process described above is repeated. Where the test image resolution is not greater than the verified image resolution divided by $\sqrt{2}$ at block 112, the currently stored and verified image resolution and half-scan code represent the fastest image resolution/code combination that will be robust and accurate as a starting point for subsequent position recognition processes and the training process ends.

Referring once again to FIGS. 1 and 6, at block 98, if the verified code is not a half-scan code that means that the verified code is a full-scan code and therefore control passes to block 100. At block 100, processor 14 determines whether or not the test image resolution is greater than the stored or verified image resolution divided by $\sqrt{2}$. Here, an image resolution must be at least $\sqrt{2}$ times larger or coarser for a full-scan to be faster than a half-scan and therefore, because the verified code at 100 is a full scan, half-scan testing should not occur unless the test image resolution is greater than the verified image resolution divided by $\sqrt{2}$.

Where the test image resolution is greater than the verified image resolution divided by the $\sqrt{2}$, control passes to block 106 where half-scan sampling is examined to determine whether or not the half-scan code is robust at the test image resolution. To this end, at block 106, for each of the lower resolution images generated at block 68 (see again FIG. 3), processor 14 identifies a worst case peak score within a 1×3 region 201 about the peak score location that was identified at block 90. Referring again to FIG. 7 where the peak score location is at score 99, running a half scan, every other location in the region 201 is sampled and evaluated. Depending on where the 1×3 region 200 falls within a coarse image resolution image, in the illustrated example the evaluated scores may include 62 and 48 or 99. Thus, here, the worst case peak score using the half-scan code would be 62.

Referring still to FIG. 6, at block 108, processor 14 compares the worst case peak score to a threshold percentage of the highest other score within the score space outside the 1×3 region 201. Once again, as in block 94, the threshold percentage in block 108 is 105%. Where the worst case peak score is greater than 105% of the highest other score within the score space outside the region 201 for each of the lower resolution images, control passes to block 114 where the verified image resolution/code combination is replaced by the test image resolution/half-scan code combination after which control passes to block 116. At block 116, the test image resolution is decreased by one and control passes back to block 62 in FIG. 3 where the process described above is repeated. Referring again to decision block 108, where the worst case peak score is less than 105% of the highest other score within the score space outside region 201, the half-scan code is not robust for the current test image resolution and therefore control passes to block 116 where the test image resolution is decreased by 1 and control again passes to block 62 in FIG. 3.

Referring yet again to FIGS. 1 and 6, at block 100, where the current test image resolution is less than the verified image resolution divided by the half-scan code at the test image resolution cannot be faster than the verified image resolution and full-scan code and therefore the half-scan code should not be tested for the current test image resolution and control passes to block 102. At block 102, the current test image resolution is decreased by one (or other suitable value) and at block 104 processor 14 determines whether or not the next test image resolution (e.g., the image resolution set at block 102) is greater than the verified image resolution divided 2. Here, an image resolution must be at least two times larger or coarser for a full scan to be faster than a quarter scan and therefore, to continue searching for an image resolution and quarter-scan combination that is faster than a stored and verified combination including the full scan code, the condition at block 104 must be met. Where the condition at block 104 is not met, the process ends because the verified and store image resolution and full scan code are the fastest accurate and robust combination. Where the condition at block 104 is met, control passes back to block 62 in FIG. 3 the process described above continues at a finer image resolution.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

Thus, this disclosure is to cover all modifications, equivalents, and alternatives falling within the spirit and scope of the invention as defined by the following appended claims. For example, while a specific sequence of steps is described above, in other embodiments the steps may take a different order and achieve the same or similar result. For instance, referring to FIG. 3, the lower resolution images at block 66 could be generated prior to block 64 or even prior to any of blocks 62, 60, 58, 56, etc.

Figure 8:
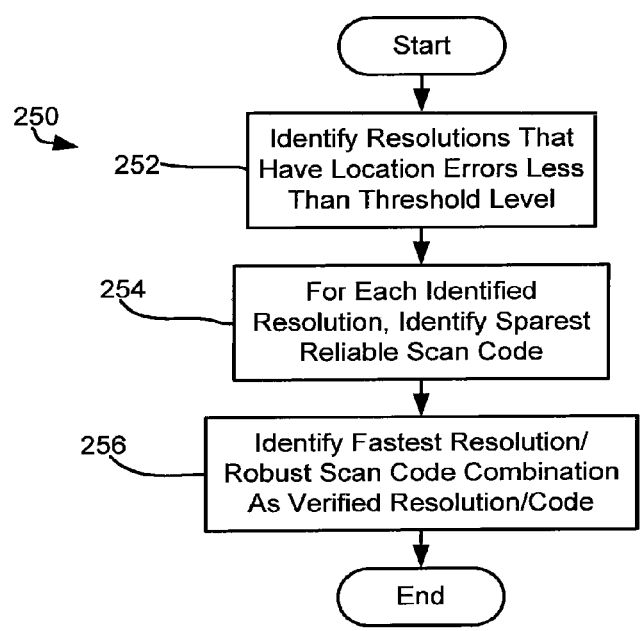
FIG. 8 is a flow chart illustrating another exemplary process that is consistent with at least some aspects of the present invention.

As another example, while the process described above is relatively fast because decisions are made during the process that eliminate sub-processes that cannot possibly identify more optimal results, in other less efficient embodiments all image resolution and code combinations may be attempted to generate results and then processor 64 may select the optimal image resolution/scan code combination from the full slate of results. This process 250 is shown in FIG. 8 where, at block 252, processor 14 identifies all resolutions that have location errors less than the threshold level (see again blocks 52-70 in FIG. 3). At block 254, for each identified image resolution, processor 14 identifies the sparsest robust scan code. At block 256, processor 14 identifies the fastest image resolution/scan code combination after which the process ends.

Similarly, the first portion of the process that ends at block 70 in FIG. 3 may be performed for all resolutions supported by the system to identify resolutions that would possibly work as recognition starting points and thereafter, for possibly starting point resolutions, sparsest robust scan code may be identified. Still in other cases processor 14 may try quarter-scan codes for all resolutions that may possible work and, when an image resolution and quarter-scan code combination with the coarsest image resolution that works is identified, may only try full and/or half-scan codes with coarser image resolutions to speed up the training process.

In addition, referring again to FIG. 3, while coarse subpixel phase images are generated at block 66, it should be appreciated that in other embodiments the test image could be used to generate other lower resolution images for testing purposes. For instance, in some embodiments the test image from block 53 could be translated in one or more different degrees of freedom to generate other test images. Here, the different degrees of freedom could include rotation, shear, aspect and scale. Thereafter the testing at blocks 68 and 70 could be applied to each of lower resolution images. As another instance, one or more degrees of translation could be applied to the test image to generate an intermediate image set and then each intermediate image could be used to generate a complete set of coarse subpixel phase images and the block 68 and 70 process could be applied to each of the subpixel phase images. Any combination of degrees of freedom and subpixel phases are contemplated.

Figure 9:
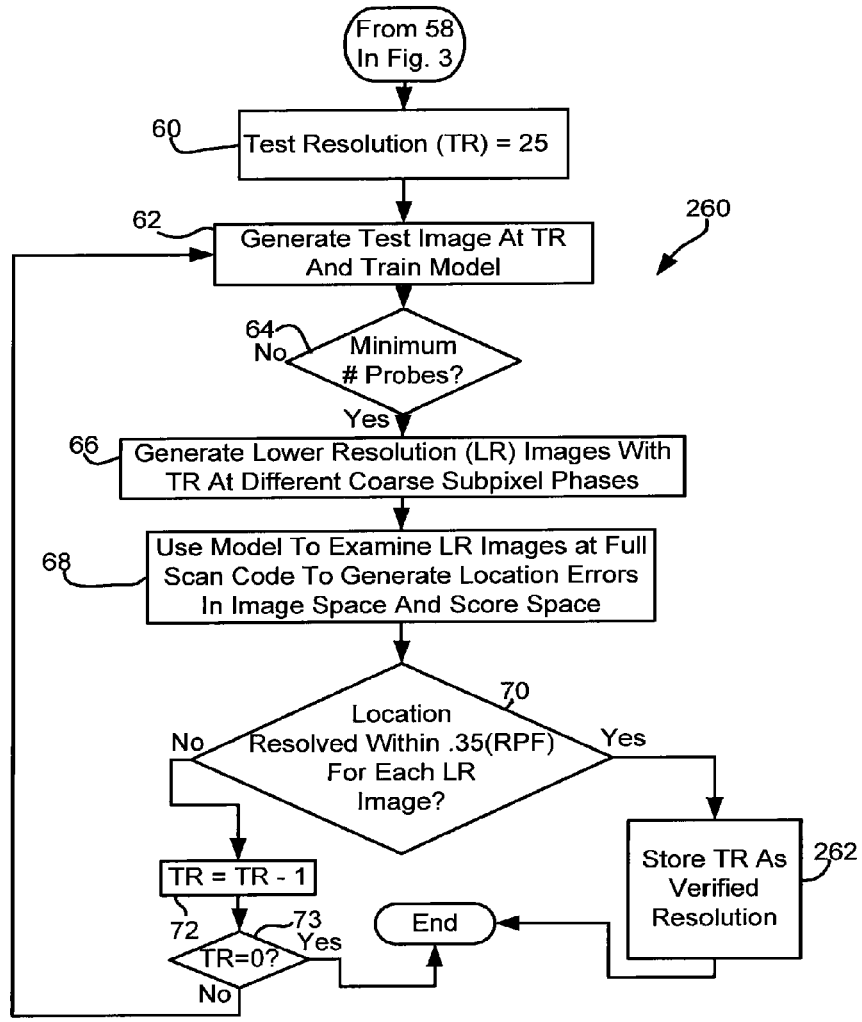
FIG. 9 is a flow chart illustrating a sub-process that may be substituted for a portion of the process shown in FIG. 3.

In still other embodiments finding a coarsest robust test image resolution for initiating a recognition process may be useful independent of whether or not a fastest scan code for the image resolution is identified. To this end, a sub-process 260 that may be substituted for a portion of the process shown in FIG. 3 is illustrated in FIG. 9. In sub-process 260, blocks that are similar or identical to blocks described above with respect to FIG. 3 are identified via the same numbers and operate in the same fashion as described above unless indicated otherwise. For instance, block 62 in FIG. 9 is identical to block 62 in FIG. 3, block 64 in FIG. 9 is identical to block 64 in FIG. 3, and so on.

Referring to FIGS. 3 and 9, after the RPF is identified at block 58 in FIG. 3, control passes to process block 60 in FIG. 9 where a test image resolution TR is set equal to a coarsest image resolution (e.g., 25 in the illustrated example). In FIG. 9, unlike in FIG. 3, no flag is set at block 60 because the flag is not needed since the FIG. 9 sub-process 260 stops once one robust image resolution is identified. After block 60 control passes to blocks 62, 64 and 66 which operate as described above with respect to FIG. 3.

At block 68, the model developed at block 62 is used to examine each lower resolution image from block 66 at full scan code to generate location errors in image space. At block 70, the locations for each lower resolution image identified at block 68 are compared to the threshold percentage (e.g., 35%) of the RPF and, where any one of the location errors exceeds the threshold percentage, control passes to block 72 where TR is decremented and control passes to block 73. At block 73, as in FIG. 3, where TR is greater than one control passes back up to block 62 and where TR is less than one the process ends. Referring again to block 70 in FIG. 9, where none of the location errors exceeds the threshold percentage of the RPF, control passes to block 262 where the TR is stored as a verified image resolution.

Thus, sub-process 260 in FIG. 9 identifies a coarsest robust image resolution to be used as an initial image resolution during subsequent recognition processes for identifying a pattern with repeating elements.

In addition to being useful during a model training process for use with a pattern that includes repeating elements, it is contemplated that a version of the process shown in FIG. 3 may also be useful during a training process for use with general patterns that do not include repeating elements. To this end, referring to FIG. 10, a sub-process 270 that may be substituted for a portion of the process in FIG. 3 is illustrated. Here again, blocks that are identical or similar to blocks described above with respect to FIG. 3 are labeled using the same numbers and operate in the fashion described above unless indicated otherwise.

Figure 10:
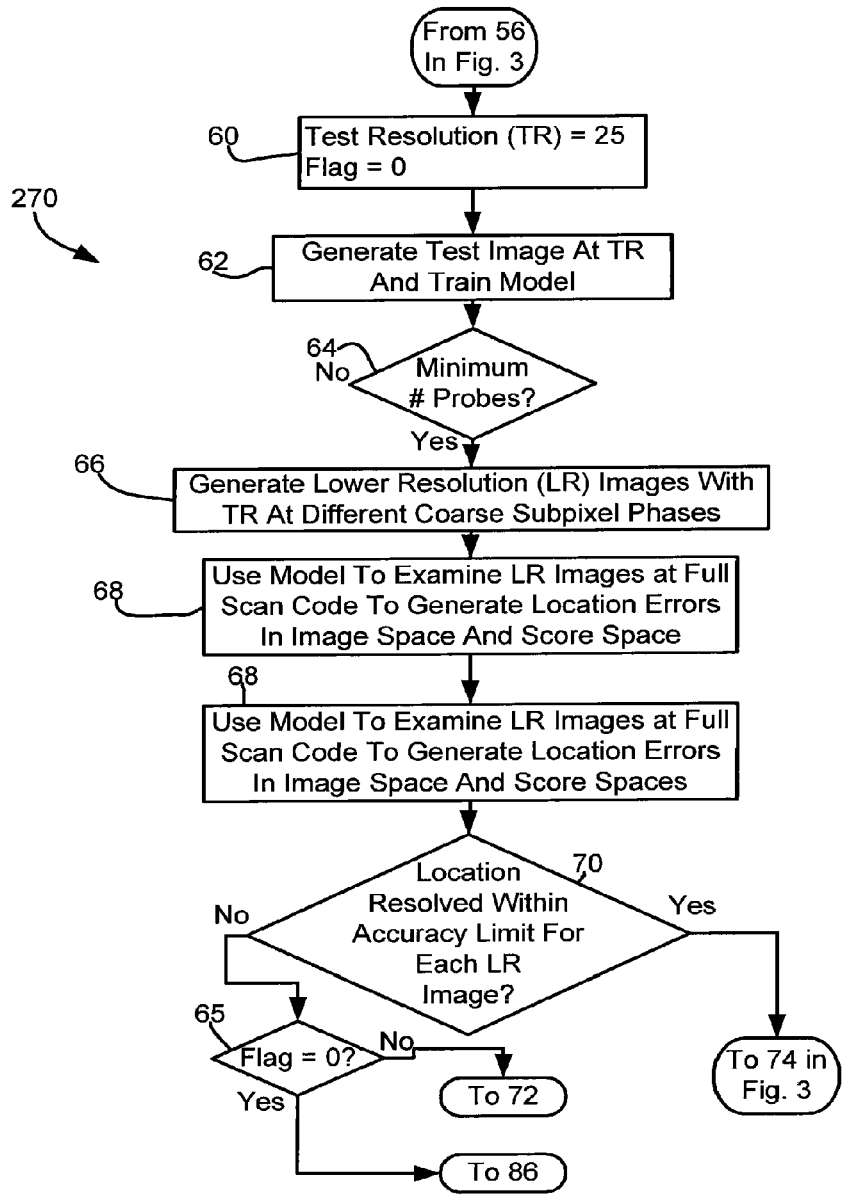
FIG. 10 is a flow chart illustrating a sub-process that may be substituted for a portion of the process shown in FIG. 3.

Referring to FIGS. 3 and 10, after block 56, control passes to block 60 in FIG. 10. Thus, here, because sub-process 270 is for developing a model for a pattern that may not include repeating elements, block 58 from FIG. 3 is skipped and it is assumed that some threshold (e.g., a threshold offset in pixels from a known or actual location of the pattern in the image) for a location error is instead specified and known.

Blocks 60, 62, 64, 66 and 68 function as described above with respect to FIG. 3 and separate location errors for each lower resolution image at block 66 are generated. Here the location errors may each indicate a difference (e.g., in pixels) between a known or actual location of the pattern in the full image resolution image and the identified location in the lower resolution image. At block 70, the location errors for each of the lower resolution images identified at block 68 are compared to a threshold location error or accuracy limit and, where at least one location error is greater than the accuracy limit, control passes to block 65 that functions as described above with respect to FIG. 3. Referring again to block 70 in FIG. 10, where none of the location errors associated with the lower resolution images for the current TR is greater than the accuracy limit, control passes to block 74 where the process described above with respect to FIGS. 3 and 6 continues until an optimal TR and scan code combination is identified and stored as a verified TR/code combination. Here, the accuracy limit may include any suitable limit. For instance, in some embodiments the limit may be selected to ensure that accuracy using an associated image resolution is within a specific fraction of a recovery ability of a second image resolution refinement step. As another instance, the threshold or accuracy limit may require an accuracy to be better than the more restrictive of a percentage of a repeating pattern frequency or the recovery ability of a second image resolution refinement step. Other limits are contemplated.

Figure 11:
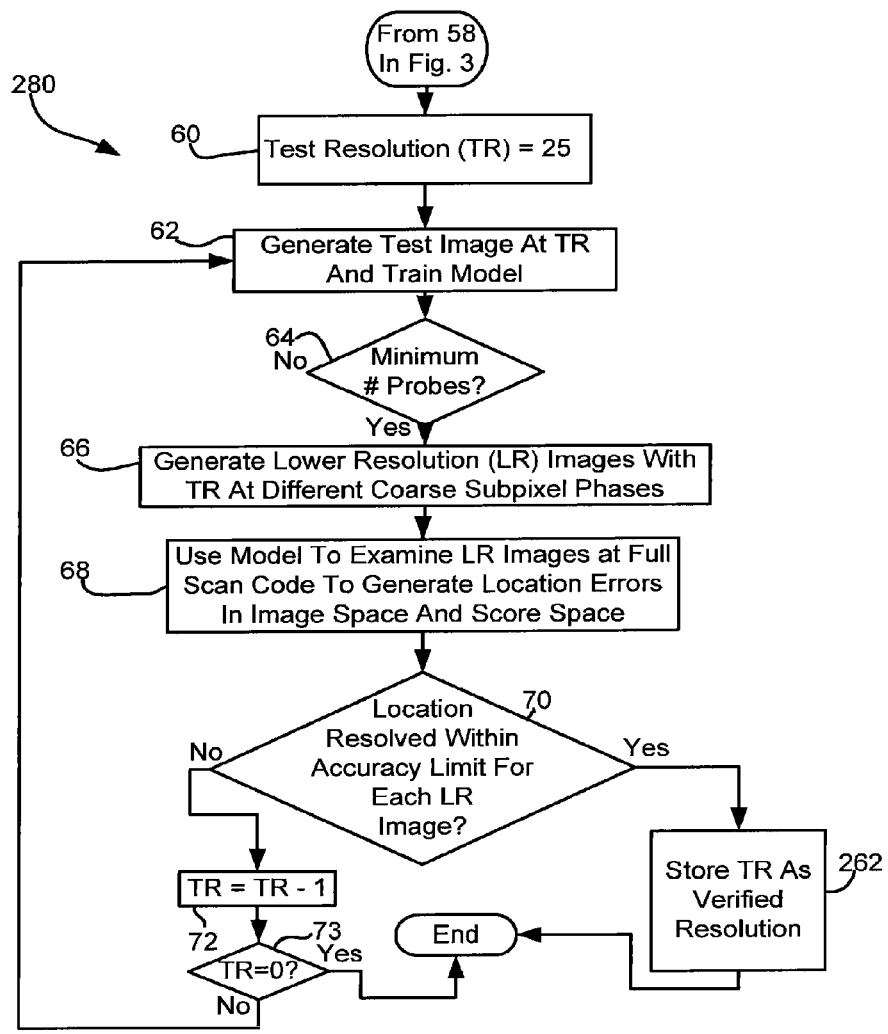
FIG. 11 is a flow chart illustrating a sub-process that may be substituted for a portion of the process shown in FIG. 3.

In other embodiments a training process similar to the process of FIGS. 3 and 9 may be performed for a general pattern (e.g., a pattern that may or may not include repeating elements) where only test resolutions are tested (e.g., where the sparsest robust scan code is not identified). To this end, a sub-process 280 that may be substituted for a portion of FIG. 3 is illustrated in FIG. 11. In FIG. 11, again, blocks that are similar to or identical to blocks in FIG. 3 are labeled in a similar fashion and operate or function in the ways described above unless indicated otherwise.

Referring to FIGS. 3 and 11, after block 56 in FIG. 3, control passes to block 60 in FIG. 11 (i.e., as in the sub-process of FIG. 10, block 58 in FIG. 3 is skipped here because there may be no repeating elements in the training pattern). Here, as in the sub-process of FIG. 10, because the process stops once one robust image resolution is identified, no flag is set at block 60 (compare to block 60 in FIG. 3 where the process may continue after a robust image resolution is identified and therefore the flag is needed).

Blocks 62, 64, 66 and 68 function as described above with respect to FIG. 3. At block 70, the location errors for each of the lower resolution images at the current test image resolution are compared to an accuracy limit or threshold location error and where any one of the location errors is greater than the accuracy limit, control passes to blocks 72 and 73 that function as described above with respect to FIG. 3. At block 70, where none of the location errors is greater than the accuracy limit, control passes to block 262 where the current TR is stored as a verified image resolution and the process ends.

Figure 12:
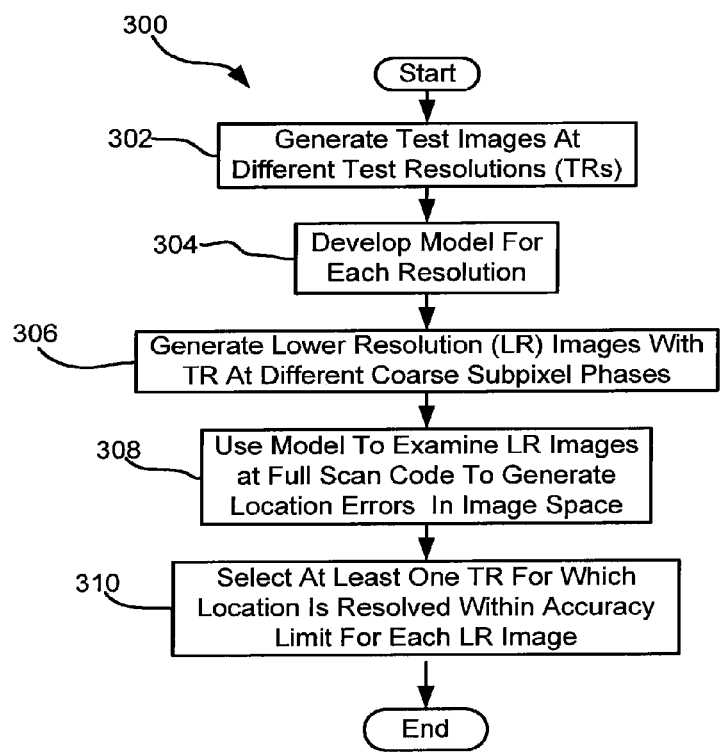
FIG. 12 is a flow chart illustrating a general process whereby a robust test image resolution is selected for use as an initial image resolution during subsequent recognition processes.

From the foregoing it should be appreciated that, in a general sense, the present disclosure contemplates a generalized training process that could be used with any model based pattern recognition system to identify one or more robust starting resolutions for use during subsequent pattern recognition processes. To this end, a generalized process 300 is illustrated in FIG. 12. At block 302, test images of a pattern are generated at different test resolutions. At block 304, a pattern recognition model is generated for each of the test resolutions. At block 306, different lower resolution images are generated for each image resolution. At block 308, each model is used to examine the lower resolution images at the associated image resolution to generate location errors. At block 310, at least one of the TRs that has locations resolved for each lower resolution image within a threshold of the actual pattern location is stored for subsequent use.

While many of the processes described above function to identify an optimal image resolution and scan code combination or an optimal image resolution, it should be appreciated that similar processes are contemplated where the selected combination or image resolution, while robust, may not be optimal. For instance, where five resolutions may be robust as starting points for subsequent recognition processes, a second or third fastest of the five image resolution may be selected.

In addition, it is contemplated that in some embodiments, instead of identifying one robust image resolution/code combination or image resolution, other processes may identify two or more robust combinations or resolutions where the multiple combinations or resolutions may be used sequentially during subsequent processes when initial recognition attempts fail. Thus, for instance, where first and second robust combinations are identified and stored for subsequent use, if a recognition process initiated with the first combination fails, a second recognition process may be initiated using the second combination, and so on.

Moreover, in at least some embodiments it is contemplated that server 14 may include multiple processors, processor cores or computers so that multiple threads can be carried out in parallel to identify robust coarse image resolution and scan code combinations or a fastest robust combination relatively quickly. Here, for instance, one processor may search for resolution/code combinations starting with a lowest resolution image and quarter code while another processor starts with a lowest resolution image and full scan code and a third processor may start with a lowest resolution image and half scan code. Other parallel processes are contemplated.

Referring now to Table 1 below, exemplary results of a substantially complete training process as described above with respect to FIG. 3 are illustrated along with results from a traditional training algorithm. The results are arranged in columns including an image resolution column, a worst location error column, a sparsest robust scan code column, a number of probes column and a traditional training ratings column. In this example, the repeating pattern frequency (see block 58 in FIG. 3) was 19 pixels, meaning that the worst case location error has to be less than 6.65 pixel (i.e., 0.35×19). Assuming a minimum number of test probes of 64, the exemplary training method would select a fastest combination including an image with resolution of 23 and a quarter-scan code (e.g., the image resolution of 23 and quarter-scan combination has a worst case location error 4.60 less than 6.65 and has at least the minimum number of probes). Although not shown, based on the traditional training ratings, the image resolution and code combination that would have been selected would have been an image resolution of 9 and the quarter-scan code. As seen in Table 1 below, an image resolution of 9 requires half-scan to work properly in this example so the traditional training algorithm would have selected a starting image resolution and code combination that would not have robustly located the pattern in the image.

TABLE 1

| Image resolution | Worst Location Error | Sparsest Robust Scan Code | Number Probes | Traditional Training Ratings |
|---|---|---|---|---|
| 25 | 10.04 | eScanQuarter | 47 | |
| 24 | 8.56 | eScanQuarter | 64 | |
| 23 | 4.60 | eScanQuarter | 64 | |
| 22 | 30.8 | eScanQuarter | 64 | |
| 21 | 4.19 | eScanQuarter | 64 | 4232 |
| 20 | 2.92 | eScanQuarter | 64 | 6328 |
| 19 | 5.23 | eScanQuarter | 64 | 3283 |
| 18 | 3.82 | eScanQuarter | 64 | 6298 |
| 17 | 3.44 | eScanQuarter | 64 | 5819 |
| 16 | 5.34 | eScanQuarter | 64 | 6208 |

TABLE 1-continued

| Image resolution | Worst Location Error | Sparsest Robust Scan Code | Number Probes | Traditional Training Ratings |
|---|---|---|---|---|
| 15 | 2.87 | eScanQuarter | 64 | 6218 |
| 14 | 2.78 | eScanQuarter | 64 | 6426 |
| 13 | 1.47 | eScanQuarter | 64 | 3079+ |
| 12 | 1.72 | eScanQuarter | 64 | 6296 |
| 11 | 1.04 | eScanQuarter | 64 | 6454 |
| 10 | 2.15 | eScanQuarter | 67 | 6436 |
| 9 | 1.06 | eScanHalf | 64 | 6741 |
| 8 | 1.34 | eScanFull | 64 | 6829 |
| 7 | 1.69 | eScanFull | 19 | 4377 |
| 6 | Not Found | — | — | — |
| 5 | Not Found | — | — | — |
| 4 | Not Found | — | — | — |
| 3 | 18.89 | eScanFull | 63 | 158 |
| 2 | 18.92 | eScanFull | 1174 | 877 |

To apprise the public of the scope of this invention, the following claims are made:

What is claimed is:

1. A method for training a pattern recognition algorithm for a machine vision system that uses models of a pattern to be located, the method comprising the steps of:
   (a) identifying the known location of the pattern that includes repeating elements within a fine image resolution image;
   (b) using the fine image resolution image to train a model associated with the fine image;
   (c) using the model associated with the fine image to examine the fine image resolution image and to generate a score space;
   (d) examining the score space to identify a repeating pattern frequency;
   (e) using a coarse image at a coarse image resolution that is coarser than the finest image resolution image to train a model associated with the coarse image;
   (f) using the model associated with the coarse image to examine the coarse image thereby generating a location error;
   (g) comparing the location error to the repeating pattern frequency; and
   (h) based on the comparison, determining if the coarse image resolution is suitable for locating the pattern within a fraction of one pitch of the repeating elements.

2. The method of claim 1 further including the step of using the coarse image to generate a plurality of lower resolution images at different coarse subpixel phases and wherein steps (f) through (h) are performed for each of the lower resolution images.

3. The method of claim 1 further including the steps of (i) using the model associated with the coarse image to examine the coarse image thereby generating a score space associated with the coarse image and (j) examining the score space associated with the coarse image to identify a sparsest scan code that is robust at the coarse image resolution.

4. The method of claim 3 further including the step of using the coarse image to generate a plurality of lower resolution images at different coarse subpixel phases and wherein steps (i) and (j) are performed for each of the lower resolution images.

5. The method of claim 4 wherein the fine image resolution is a finest image resolution.

6. The method of claim 3 wherein each model includes a plurality of probes that are each a measure of similarity of at least one of a run-time image feature and a run time image region to at least one of a pattern feature and a pattern region, the step of using the model associated with the fine image to examine the fine image resolution image and to generate a score space including the steps of applying the plurality of probes in the model associated with the fine image at a plurality of poses to the fine image resulting in a plurality of score spaces at each pose where the score spaces include peaks, the peaks indicating likely locations of occurrences of the pattern in the fine image at each pose.

7. The method of claim 6 wherein the step of using the model associated with the coarse image to examine the coarse image resolution image and to generate a score space includes the steps of applying the plurality of probes in the model associated with the coarse image at a plurality of poses to the coarse image resulting in a plurality of score spaces at each pose where the score spaces include peaks, the peaks indicating likely locations of occurrences of the pattern in the coarse image at each pose.

8. The apparatus of claim 3 wherein the fine image resolution is a finest image resolution.

9. The method of claim 1 wherein the fine image resolution is a finest image resolution.

10. The method of claim 1 wherein each model includes a plurality of probes that are each a measure of similarity of at least one of a run-time image feature and a run time image region to at least one of a pattern feature and a pattern region, respectively, at a specific location.

11. An apparatus for training a pattern recognition algorithm for a machine vision system that uses models of a pattern to be located, the apparatus comprising:
   a processor programmed to perform the steps of:
   (a) identifying the known location of the pattern that includes repeating elements within a finest image resolution image;
   (b) using the finest image resolution image to train a model;
   (c) using the model to examine the finest image resolution image and to generate a score space;
   (d) examining the score space to identify a repeating pattern frequency;
   (e) using a coarse image at a coarse image resolution that is coarser than the finest image resolution image to train a model;
   (f) using the model associated with the coarse image to examine the coarse image thereby generating a location error;
   (g) comparing the location error to the repeating pattern frequency; and
   (h) based on the comparison, determining if the coarse image resolution is suitable for locating the pattern within a fraction of one pitch of the repeating elements.

12. The apparatus of claim 11 wherein the processor is programmed to further perform the steps of using the coarse image to generate a plurality of lower resolution images at different coarse subpixel phases and wherein steps (f) through (h) are performed for each of the lower resolution images.

13. The apparatus of claim 11 wherein the processor is further programmed to perform the steps of (i) using the model associated with the coarse image to examine the coarse image thereby generating a score space associated with the coarse image and (j) examining the score space associated with the coarse image to identify a sparsest scan code that is robust at the coarse image resolution.

14. The apparatus of claim 13 wherein the processor is further programmed to perform the step of using the coarse image to generate a plurality of lower resolution images at different coarse subpixel phases and wherein steps (i) and (j) are performed for each of the lower resolution images.

15. The apparatus of claim 13 wherein each model includes a plurality of probes that are each a measure of similarity of at least one of a run-time image feature and a run time image region to at least one of a pattern feature and a pattern region, the step of using the model associated with the fine image to examine the fine image resolution image and to generate a score space including the steps of applying the plurality of probes in the model associated with the fine image at a plurality of poses to the fine image resulting in a plurality of score spaces at each pose where the score spaces include peaks, the peaks indicating likely locations of occurrences of the pattern in the fine image at each pose.

16. The apparatus of claim 15 wherein the step of using the model associated with the coarse image to examine the coarse image resolution image and to generate a score space includes the steps of applying the plurality of probes in the model associated with the coarse image at a plurality of poses to the coarse image resulting in a plurality of score spaces at each pose where the score spaces include peaks, the peaks indicating likely locations of occurrences of the pattern in the coarse image at each pose.

17. The apparatus of claim 11 wherein the fine image resolution is a finest image resolution.

18. The apparatus of claim 11 wherein each model includes a plurality of probes that are each a measure of similarity of at least one of a run-time image feature and a run time image region to at least one of a pattern feature and a pattern region, respectively, at a specific location.

\* \* \* \* \*